May 18, 1943. H. W. ROMANOFF 2,319,558
WIRE CUTTING TOOL
Filed June 26, 1941 2 Sheets-Sheet 1
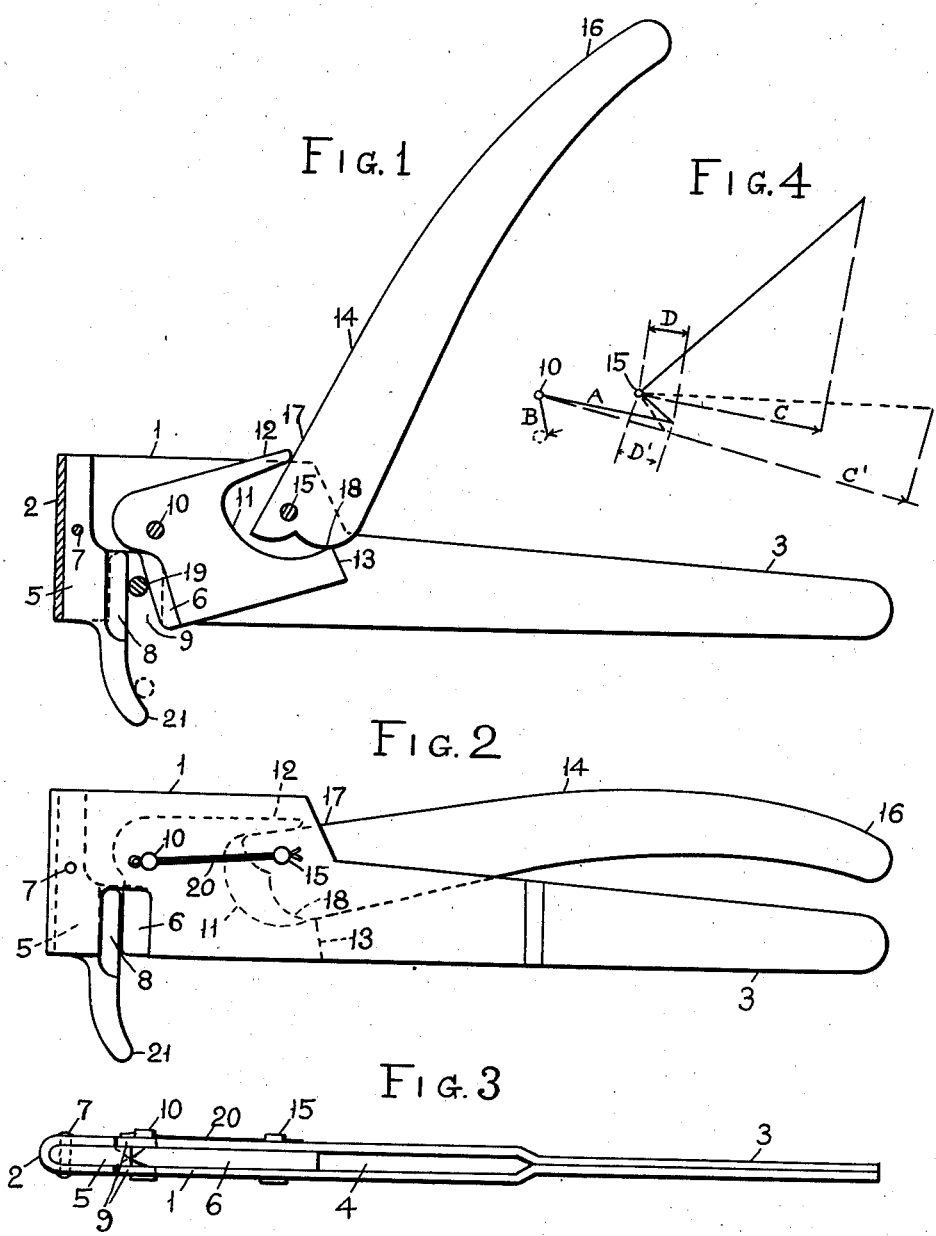
HIPPOLYTE W. ROMANOFF
INVENTOR.
BY John P. Wilronon
ATTORNEY May 18, 1943. H. W. ROMANOFF 2,319,558
WIRE CUTTING TOOL
Filed June 26, 1941 2 Sheets-Sheet 2
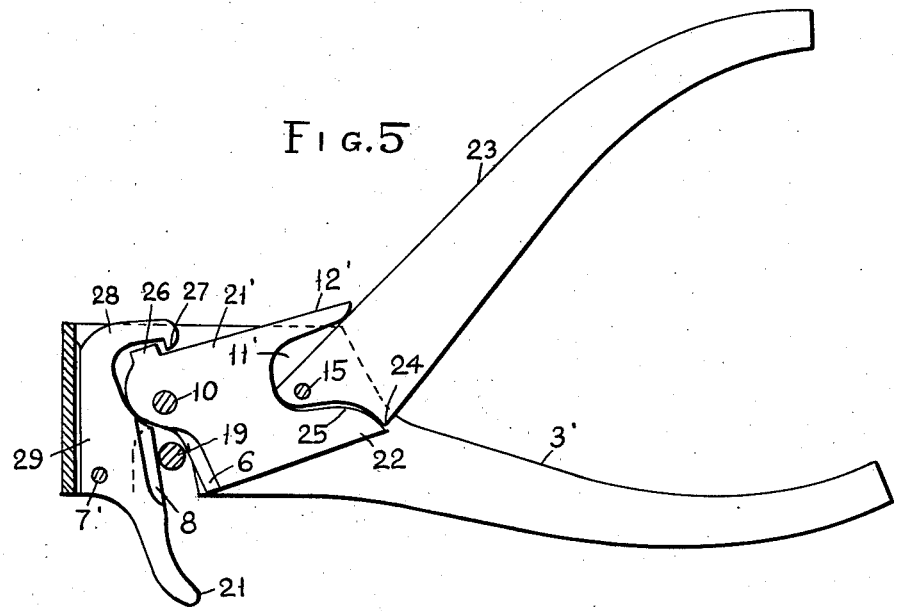
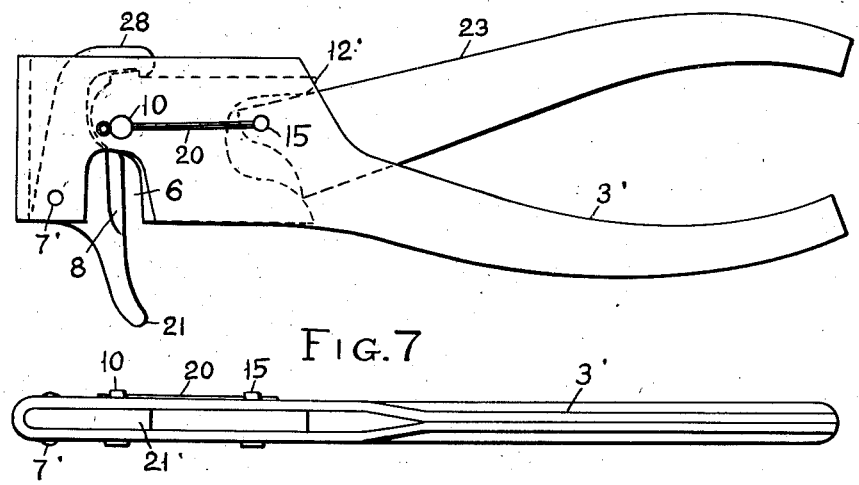
HIPPOLYTE W. ROMANOFF
INVENTOR.
BY John P. Wilson
ATTORNEY Patented May 18, 1943

2,319,558

UNITED STATES PATENT OFFICE 2,319,558

WIRE CUTTING TOOL

Hippolyte W. Romanoff, New York, N. Y., assignor to "V" Cutter Corporation, a corporation of Delaware Application June 26, 1941, Serial No. 399,787

1 Claim. (Cl. 30—189)

My invention relates to wire cutting tools and has particular reference to portable tools for cutting heavy wire.

My invention has for its object to provide a portable tool particularly adapted for cutting barbed wire entanglement cables, steel wire, etc., which will be light, strong and inexpensive for manufacturing, and which will have provision for greatly increasing the applied force so that heavy wire can be cut with one hand. I provide my cutter for this purpose with a cam connection between the movable jaw or cutter and the handle.

Another object of my invention is to provide a cutter with but a few parts so arranged that every part can be removed for repairs or replacement without removing the other parts.

Another object of my invention is to provide a simple and effective cutting tool without any springs, the movable cutter and the handle being so interlocked that the cutter follows the handle movements in either direction.

Still another object of my invention is to provide a wire cutting tool in which leverage ratio between the handle and the movable cutter gradually increases as the movable cutter is moved toward the stationary cutter, thereby increasing the cutting force in accordance with the increase in the cross-sectional area of the cut in the wire.

My invention is more fully described in the accompanying specification and drawings, in which:

Fig. 1 is a sectional side view of my cutting tool in an open or inoperative position;

Fig. 2 is an outside view of the same in a closed or operative position;

Fig. 3 is an edge view of the same; and

Fig. 4 is a diagram of forces in the tool.

Fig. 5 is a side view of a modified device in an open position;

Fig. 6 is a side view of the same in a closed position; and

Fig. 7 is an edge view of the same.

My wire cutting tool consists of a main member 1 made of a steel bar bent upon itself at 2 and joined at the handle portion 3. A clearance 4 is provided between the sides of the bar for a stationary cutter or lever 5 and a movable cutter 6. The stationary cutter is fastened as by a rivet or pin 7 and extends with its cutting edge 8 into a slot 9 in the member 1. The movable cutter 6 is pivoted on a removable pin 10 and has a curved recess 11 at the rear and prongs 12 and 13. A bar 14 is pivoted on a removable pin 15 between the sides of the bar and has a handle portion 16 and cam portions 17 and 18. The cam portion 17 engages the prong 12 in such a manner that the movable cutter 6 is turned on its pivot and moved away from the stationary cutter 5 when the bar 14 is turned into an open or inoperative position as shown in Fig. 1. The recess 11 is so shaped that the cam portion 18, while remaining in contact with the point of the prong 13, does not interfere with the rotation of the movable cutter.

By moving the bar 14 toward the handle 3, the cam 18 is made to slide over the prong 13, causing rotation of the movable cutter toward the stationary cutter 5 for cutting a wire 19. A double leverage is thus provided, greatly multiplying the cutting force, so that with a relatively small and light tool of a pocket size it is possible easily to cut heavy barbed wire, steel wire, cables, etc.

The pins 10 and 15 are held in place by a cotter pin 20 passing through corresponding holes in the pins. Both pins can be removed by removing the cotter pin, thus releasing the movable cutter and the lever 14. If desired, one part only can be removed, movable cutter or the bar. It is very easy therefore to make repairs and replacements on my tool. An extension 21 may be provided on the stationary cutter 5 for guiding the wire 19 into the slot 9 between the cutting edges of the cutters 5 and 6.

The levers and cams in my tool are so arranged that the cutting force is gradually increased with the penetration of the cutters toward the center of the wire. This is important in view of the fact that the cross-sectional area of the wire traversed by the cutters increases toward the center of the wire. The speed of cutting is therefore proportionately increased at the start and is gradually slowed down as the force is increased.

Distribution of forces is shown diagrammatically in Fig. 4. At the start of the cutting operation we have a total leverage:

$$\frac{C}{D} \times \frac{A}{B}$$

Toward the end of the cutting operation the leverage is changed as shown in dotted lines:

$$\frac{C'}{D'} \times \frac{A}{B}$$

It may be seen that the arm C of the moment of force acting on the end of the lever A at the beginning of the operation is materially smaller than the arm C' of the same force at the end of the operation, the other changes being relatively small. The ratio C':C can be varied within more or less wide limits by varying the relative dimensions of the operating parts of the tool.

A modified device is shown in Figs. 5, 6 and 7. Its movable lever 21' has prongs 12' and 22 at the rear with a recess 11' for the inner end of a bar 23. The bar 23 has a pointed end 24 engaging a convex portion 25 of the prong 22. The cutter lever 21' has a lug 26 at the top engaging a hook 27 on an upper extension 28 of a front cutter 29. The latter is pivoted at 7' and is turned by the lug 26 when the bar 23 is moved against the handle 3'.

With this arrangement it is possible to obtain a relatively large opening between the jaws or cutters for a wire 19 as shown in Fig. 1, the cutting portions or jaws being drawn together as shown in Fig. 2, both jaws moving toward each other. An almost parallel movement of the jaws is thereby obtained.

It is understood that my wire cutting tool may be further modified without departing from the spirit of the invention, as set forth in the appended claim.

I claim as my invention:

A wire cutting tool comprising an elongated member having a handle at the rear end, the front end having a slot at the side for receiving a wire to be cut, a front cutter having its cutting edge at the front of the slot, a lever rotatively supported in a transverse opening in the elongated member having a short and a long portion, the short inner end of the lever having a cutting edge in cooperation with the front cutter, a bar pivotally supported in the transverse opening of the elongated member back of the lever and having a handle at the rear end, and outer and inner prongs extending from the long portion of the lever with a recess therebetween, the inner end of the bar being positioned in the recess between the prongs and having outer and inner cam portions, the outer cam portion engaging the outer prong at a point between the pivoting point of the bar and its handle, the bar being thereby adapted to rotate the cover for moving the cutting edge away from the front cutter when the bar is turned outward, the inner cam portion being of a convex shape and engaging the end portion of the inner prong for rotating the lever so as to advance its cutting edge against the front cutter.

HIPPOLYTE W. ROMANOFF.